United States Patent [19]

Hayasaka

[11] 4,407,570
[45] Oct. 4, 1983

[54] SPECIMEN HOLDING DEVICE FOR MICROSCOPE STAGES

[75] Inventor: Toshimi Hayasaka, Hachioji, Japan

[73] Assignee: Olympus Optical Company Ltd., Tokyo, Japan

[21] Appl. No.: 244,073

[22] Filed: Mar. 16, 1981

[30] Foreign Application Priority Data

Mar. 17, 1980 [JP] Japan .................................. 55/35486

[51] Int. Cl.³ ............................................ G02B 21/26
[52] U.S. Cl. ................................................. 350/529
[58] Field of Search ................................... 350/92–95, 350/529–531

[56] References Cited

U.S. PATENT DOCUMENTS 2,656,760 10/1953 Bowerman ............................ 350/90
4,011,004 3/1977 Levine et al. ......................... 350/90

FOREIGN PATENT DOCUMENTS 352706 7/1951 Fed. Rep. of Germany ...... 350/534
140295 11/1978 German Democratic Rep. ... 350/90

Primary Examiner—Jon W. Henry
Attorney, Agent, or Firm—Parkhurst & Oliff

[57] ABSTRACT

A specimen holding device for microscope stages comprising a specimen supporting body secured to a microscope stage and a specimen push claw rotatably mounted on the specimen supporting body and urging a specimen against the specimen supporting body. The specimen supporting body and the specimen push claw are provided at respective front ends of the side edges thereof with inclined surfaces opposed with each other and inclined at an acute angle with respect to the specimen insertion direction and the distance between the front ends of the inclined surfaces is made sufficiently larger than the width of the specimen even when the specimen is not inserted between the specimen supporting body and the specimen push claw.

5 Claims, 4 Drawing Figures

SPECIMEN HOLDING DEVICE FOR MICROSCOPE STAGES

BACKGROUND OF THE INVENTION

1. Field of the Invention

This invention relates to a specimen holding device for microscope stages adapted to be moved in X and Y directions.

2. Description of the Prior Art

In a conventional microscope stage adapted to be moved in X and Y directions, a specimen supporting body is secured to the stage and a specimen push claw is rotatably mounted on the specimen supporting body. The specimen push claw is rotated by a coil spring to a position where the specimen push claw is urged against the specimen so as to hold it between the specimen push claw and the specimen supporting body. The specimen push claw is provided near its rotary shaft with a tongue made integral with the specimen push claw.

In the above mentioned well known specimen holding device, when setting the specimen to the microscope stage, it is necessary to push the tongue with one hand so as to open the specimen push claw and to insert the specimen with the other hand into a given set position on the microscope stage. As a result, in the case of setting the specimen to the microscope stage, use must be made of both hands. Thus, the conventional specimen holding device has the drawback that it is very troublesome to operate and hence inefficient for examining a large number of specimens in succession.

SUMMARY OF THE INVENTION

An object of the invention, therefore, is to provide a specimen holding device for microscope stages which can eliminate the above mentioned drawback which has been encountered with the prior art techniques and which can detachably set a specimen to a microscope stage by using one hand and hence is easy and reliable in operation and which can set a large number of specimens to a microscope stage in succession with a good efficiency.

A feature of the invention is the provision in a specimen holding device for microscope stages comprising a specimen supporting body secured to a microscope stage, a specimen push claw rotatably mounted on the specimen supporting body and holding the specimen between the specimen supporting body and the specimen push claw and means for normally biasing the specimen push claw to a direction that urges the specimen against the specimen supporting body, of the improvement in which the specimen supporting body and the specimen push claw are provided at respective front ends of the side edges thereof with inclined surfaces opposed with each other and inclined at an actue angle with respect to the specimen insertion direction and in which the distance between the front ends of said inclined surfaces is made sufficiently larger than the width of the specimen even when the specimen is not inserted between said specimen supporting body and said specimen push claw.

Further objects and features of the invention will be fully understood from the following detailed description with reference to the accompanying drawings, wherein:

DETAILED DESCRIPTION OF THE PREFERRED EMBODIMENT

Figure 1:
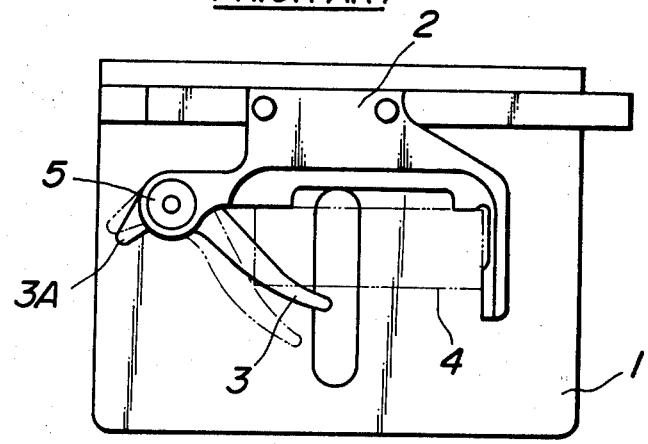
FIG. 1 is a plan view of one example of a conventional specimen holding device for microscope stages.

FIG. 1 shows one example of a conventional specimen holding device for microscope stages. In such a conventional device, to a microscope stage 1 is secured a specimen supporting body 2 on which is rotatably mounted a specimen push claw 3 through a rotary shaft 5. The specimen push claw 3 is biased in a counterclockwise direction as viewed in FIG. 1 by means of a coil spring (not shown) so as to hold a specimen 4 between the specimen push claw 3 and the specimen supporting body 2. The specimen push claw 3 is provided near its rotary shaft 5 with a tongue 3A made integral with the specimen push claw 3.

When setting the specimen 4 to the microscope stage 1, one hand is engaged with the tongue 3A to rotate the specimen push claw 3 in a clockwise direction so as to open it and then the other hand must be used to insert the specimen 4 into a desired set position shown by dot-dash lines. As a result, the conventional device requires the use of both hands in order to set the specimen 4 to the microscope stage and hence is very troublesome in operation when a large number of specimens are examined in succession, thereby lowering the operation efficiency.

Figure 2:
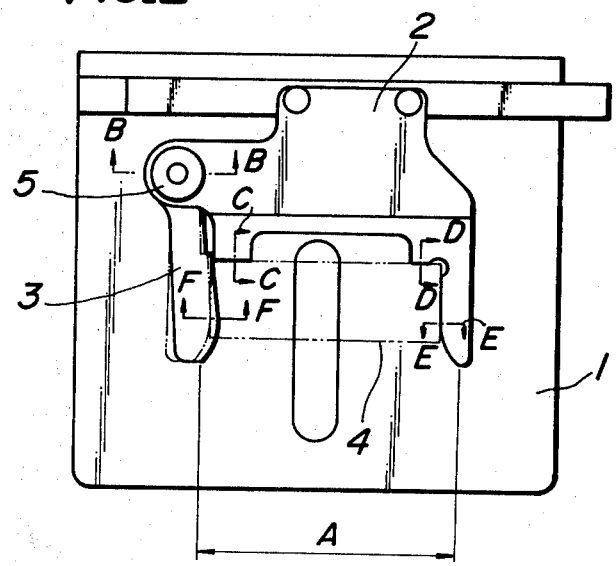
FIG. 2 is a plan view of one embodiment of a specimen holding device for microscope stages.
Figure 3:
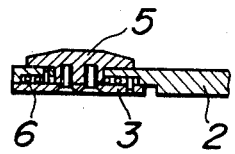
FIG. 3 is a section on line B—B of FIG. 2.
Figure 4:
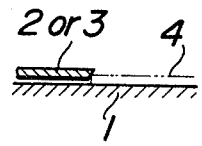
FIG. 4 is a section on line C—C, D—D, E—E or F—F of FIG. 2.

One embodiment of a specimen holding device for microscope stages according to the invention will now be described with reference to FIGS. 2 to 4. In FIGS. 2 to 4, the same reference numerals as those shown in FIG. 1 designate parts corresponding to those shown in FIG. 1.

In the present embodiment, a specimen push claw 3 is not provided near its rotary shaft 5 with a tongue 3A, contrary to the conventional device shown in FIG. 1. The specimen push claw 3 is extended by a distance which is the same as that of a specimen supporting body 2 in a direction along which a specimen 4 is inserted. The claw 3 and body 2 define a three-sided cavity which has two opposed sides and a base. The opposed front ends of the side edges of the specimen push claw 3 and the specimen supporting body 2 are inclined at an acute angle with respect to the insertion direction of the specimen 4. A distance A between the opposed front ends of the specimen push claw 3 and the specimen supporting body 2 is made larger than the width of the specimen 4 even when the specimen 4 is not held between the specimen push claw 3 and the specimen supporting body 2, that is, the specimen push claw 3 is closed in a full line position shown in FIG. 2. In addition, the specimen holding portions of the specimen supporting body 2 and specimen push claws 3, that is, those portions of the body and claw which make contact with the upper edges of the specimen when the specimen is held between these body and claw are inclined at an acute angle with respect to the thickness of the specimen as shown in FIG. 4 so as to form inclined surfaces opposed to the microscope stage 1.

As can be seen from FIG. 3, the specimen push claw 3 is rotatably mounted on the specimen supporting body 2 through a rotary shaft 5. Around the rotary shaft 5 is wound a coil spring 6 having one end secured to the specimen supporting body 2, the other end being secured to the specimen push claw 3.

The specimen holding device constructed as above described according to the invention will operate as follows. In the case of setting the specimen 4 to the microscope stage 1, the specimen 4 is held by one hand and urged against the upper surface of the stage 1. Then, the specimen 4 is slidably moved along the upper surface of the stage 1 from the lower portion toward the upper part thereof as viewed in FIG. 2. As above described, since the distance A between the front ends of the opposed inclined surfaces of the specimen supporting body 2 and specimen push claws 3 is made larger than the width of the specimen 4, the specimen 4 is guided along the inclined surface in a smooth manner. There is no risk of the specimen 4 being caught between the front ends of the opposed inclined surfaces. In this case, the specimen push claw 3 is rotated about the rotary shaft 5 against the spring force of the coil spring 6 in a clockwise direction as viewed in FIG. 2. As a result, it is possible to set the specimen 4 by one hand only to the microscope stage 1 in an easy and reliable manner. In addition, as can be seen from FIG. 4, each holding portion of the specimen supporting body 2 and specimen push claw 3 is provided at its side edge with an inclined surface opposed to the stage 1. This inclined side edge surface functions to urge the specimen 4 against the upper surface of the stage 1 and hence prevent the specimen from raising up from the stage 1. Thus, the specimen 4 can be held while maintaining its surface under plane condition.

As stated hereinbefore, the specimen holding device for microscope stages according to the invention is very simple in construction and can detachably mount the specimen by one hand in an easy and efficient manner.

What is claimed is:

1. A specimen holding device for a microscope stage, comprising:
    a specimen supporting body secured to the microscope stage;
    a specimen push claw rotatably mounted on said specimen supporting body, movable between an open and closed position, and biased toward said closed position;
    a three sided cavity having a base defined by said body, a first side, and a second side defined by said push claw;
    the end of said first side being provided with an outwardly inclined surface, completely nonrotatable with respect to said first side;
    the end of said push claw being provided with an outwardly inclined surface in the closed position, completely nonrotatable with respect to said push claw, said inclined surface defining an entrance to the cavity which narrows in width from the entrance toward the base, whereby a specimen moving towards said base can contact said inclined surfaces and cause said claw to rotate to an open position; wherein the edges of said first side and said push claw adjacent said cavity are downwardly inclined along their entire lengths to provide gripping means for gripping a specimen.

2. A holding device as claimed in claim 1, wherein said body has an edge adjacent said cavity which is downwardly inclined along its entire length.

3. A holding device as claimed in claim 2, wherein said body comprises said first side.

4. A holding device as claimed in claim 3, wherein said first side is immovable.

5. A holding device as claimed in claim 1, wherein the push claw is substantially parallel with the first side.

* * * * *